United States Patent [19]

Jones

[11] 4,113,562
[45] Sep. 12, 1978

[54] APPARATUS FOR CONTROLLING COOLANT LEVEL IN A LIQUID-METAL-COOLED NUCLEAR REACTOR

[75] Inventor: Robert D. Jones, Irwin, Pa.

[73] Assignee: The United States of America as represented by the United States Department of Energy, Washington, D.C.

[21] Appl. No.: 789,154

[22] Filed: Apr. 20, 1977

[51] Int. Cl.² .............................................. G21C 1/02
[52] U.S. Cl. ....................................... 176/40; 176/38; 176/50
[58] Field of Search ....................... 176/40, 65, 87, 38, 176/50, 61

[56] References Cited

U.S. PATENT DOCUMENTS

| | | | |
|---|---|---|---|
| 3,275,521 | 9/1966 | Schluderberg et al. | 176/40 |
| 3,994,777 | 11/1976 | Severson | 176/40 |
| 4,001,079 | 1/1977 | Rylatt | 176/40 |

Primary Examiner—Harvey E. Behrend
Attorney, Agent, or Firm—Dean E. Carlson; Frank H. Jackson

[57] ABSTRACT

A liquid-metal-cooled fast-breeder reactor which has a thermal liner spaced inwardly of the pressure vessel and includes means for passing bypass coolant through the annulus between the thermal liner and the pressure vessel to insulate the pressure vessel from hot outlet coolant includes control ports in the thermal liner a short distance below the normal operating coolant level in the reactor and an overflow nozzle in the pressure vessel below the control ports connected to an overflow line including a portion at an elevation such that overflow coolant flow is established when the coolant level in the reactor is above the top of the coolant ports. When no makeup coolant is added, bypass flow is inwardly through the control ports and there is no overflow; when makeup coolant is being added, coolant flow through the overflow line will maintain the coolant level.

3 Claims, 2 Drawing Figures

APPARATUS FOR CONTROLLING COOLANT LEVEL IN A LIQUID-METAL-COOLED NUCLEAR REACTOR

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

The invention is directed to structure for controlling overflow of liquid from a pressure vessel containing a volume of liquid metal with a free surface.

In the Clinch River Breeder Reactor (CRBR), sodium is employed as the liquid metal coolant and the coolant level must be maintained while providing the flexibility to add purified sodium, remove sodium for purification, and accommodate thermal expansion (swell) and contraction (shrink) of the sodium. Also the pressure vessel must be maintained below its design metal temperature of 900° F; the temperature of sodium leaving the reactor is 995° F, and the normal operating temperature of main sodium pool is about 1045° F in the upper regions. The coolant level must be maintained within an acceptable range, since a high sodium level in the reactor would cause the following:

1. Flooding of the cover gas inlet and outlet nozzles.
2. Buildup of gas pressure in the cover gas system -- resulting in the loss of riser seals, etc.
3. Assuming that the rise in level is also associated with a rise in temperature, the sodium temperature would cause the reactor vessel upper assembly to exceed maximum allowable temperatures, resulting in an unacceptable condition to occur. It is unlikely that any safety function would be affected but the reactor would have to be shut down permanently since there is not any design criteria in the ASME Code for certain materials beyond certain temperature limits. The vessel itself could withstand the pressure rise associated with an extreme level increase.

A low level would cause inadequate cooling of the reactor core.

In a previous design for the CRBR, coolant level is controlled by several standpipes penetrating the vessel and a concentric thermal liner inside the vessel and having funnel-like terminations located within a gutter on the inner periphery of the thermal liner. The outlet ends of the standpipes are connected to a sodium overflow tank, on which a recirculation and purification system takes suction. Bypass coolant in a bypass annulus between the concentric thermal liner inside the pressure vessel passes into the gutter through weirs in the top of the thermal liner. The weirs are placed below the elevation of the openings in the standpipes. On the other side of the gutter a similar series of weirs, located at an elevation higher than the openings in the standpipes, connect the gutter to a reactor outlet plenum which is a mixing region above the reactor core containing the coolant heated by passages through the core to approximately 1045° F. Coolant at 730° F enters the reactor pressure vessel via an inlet plenum below the core but a small fraction does not pass through the core and hence is not heated by nuclear fission; instead, this fraction (about 2.1 percent) of the flow is routed around the core by the core support structure, and enters the bypass annulus through holes in the thermal liner just above the juncture of the liner with the pressure vessel. Thus, the bypass coolant maintains the temperature of the pressure vessel shell below 900° F. The elevation of the coolant level is highest in the bypass annulus, intermediate in the space between the weirs and lowest in the outlet plenum; the difference in coolant level elevation between the bypass annulus and outlet plenum results from the smaller resistance to flow through the bypass annulus. The bypass annulus coolant level rises until flow to the standpipes and into the outlet plenum together equal the coolant flow into the bypass annulus. The normal coolant level in the outlet plenum is at the elevation of the weirs on the inner periphery of the gutter. A constant portion of the bypass coolant with this arrangement is always removed from the pressure vessel via the standpipes and hence constant makeup coolant flow is required or else the coolant level in the outlet plenum would gradually decrease due to the net loss of coolant. Also, it is possible for reverse flow to occur from the outlet plenum to the bypass annulus in case of level transient; this is undesirable since the pressure vessel would be exposed to the 1045° F coolant in the outlet plenum. Furthermore, as presently designed, the gutter containing the standpipe and weirs extends far enough toward the vertical center line of the pressure vessel so that physical interference does occur with the control rod drives, supports, instrumentation, and handling equipment comprising the upper internal structure of the Clinch River Breeder Reactor.

SUMMARY OF THE INVENTION

According to the invention, an open-ended cylindrical thermal liner is located inside the pressure vessel of the reactor; the vessel and liner are concentric. The liner is supported by attachment to the pressure vessel at the lower end of the liner. The liner has a plurality of control ports along a horizontal circumference below the desired coolant level in the outlet plenum. At least one overflow nozzle in the pressure vessel at an elevation below that of the control ports is connected to an overflow line including a portion establishing an overflow level for the coolant, this overflow level being equal to the elevation of the top of the control ports. Bypass coolant enters a bypass annulus between the concentric vessel and liner through a plurality of holes in the liner near its attachment to the pressure vessel. The gutter and standpipes of the previous Clinch River design are eliminated, thus avoiding the interference problem.

The level of coolant in the bypass annulus between the thermal liner and pressure vessel is maintained higher than the reactor outlet plenum coolant level by the disparity in flow resistance between core and bypass annulus flow paths. Normally, bypass coolant flows through the control ports to the outlet plenum because of the difference in levels. As outlet plenum coolant level rises due to swell (thermal expansion) or makeup coolant flow, the bypass annulus coolant level increases the same amount until bypass coolant begins to overflow via the overflow nozzle to the overflow tank. The overflow rate will increase as the levels increase until the overflow rate is sufficient to eliminate the rate of change of level of the coolant. At this point, the coolant levels in the plenum and the bypass annulus will remain constant. As soon as makeup coolant flow ceases or shrink (thermal contraction) occurs, the overflow rate exceeds the rate of change of level of the coolant. The plenum coolant level will then decrease followed by the bypass annulus coolant level; the decreasing level in the bypass annulus stops bypass coolant overflow when the level in the bypass annulus is below the overflow elevation of the coolant overflow line. Note that no overflow occurs when coolant level is constant or decreasing; the requirement of the present design for constant makeup coolant flow is obviated.

It is an object of the invention to provide a coolant level control apparatus with a variable overflow rate to eliminate the requirement for constant makeup to the reactor vessel and to provide for accommodating varying makeup rates required for Direct Heat Remove events.

It is another object of the invention to eliminate the physical interference between the upper internal structure of the reactor and the thermal liner.

It is another object of the invention to provide a coolant level control apparatus which avoids the possibility of reverse flow from the reactor outlet plenum to the bypass annulus during all normal operation and upset events.

SPECIFIC EMBODIMENT OF THE INVENTION

Figure 1:
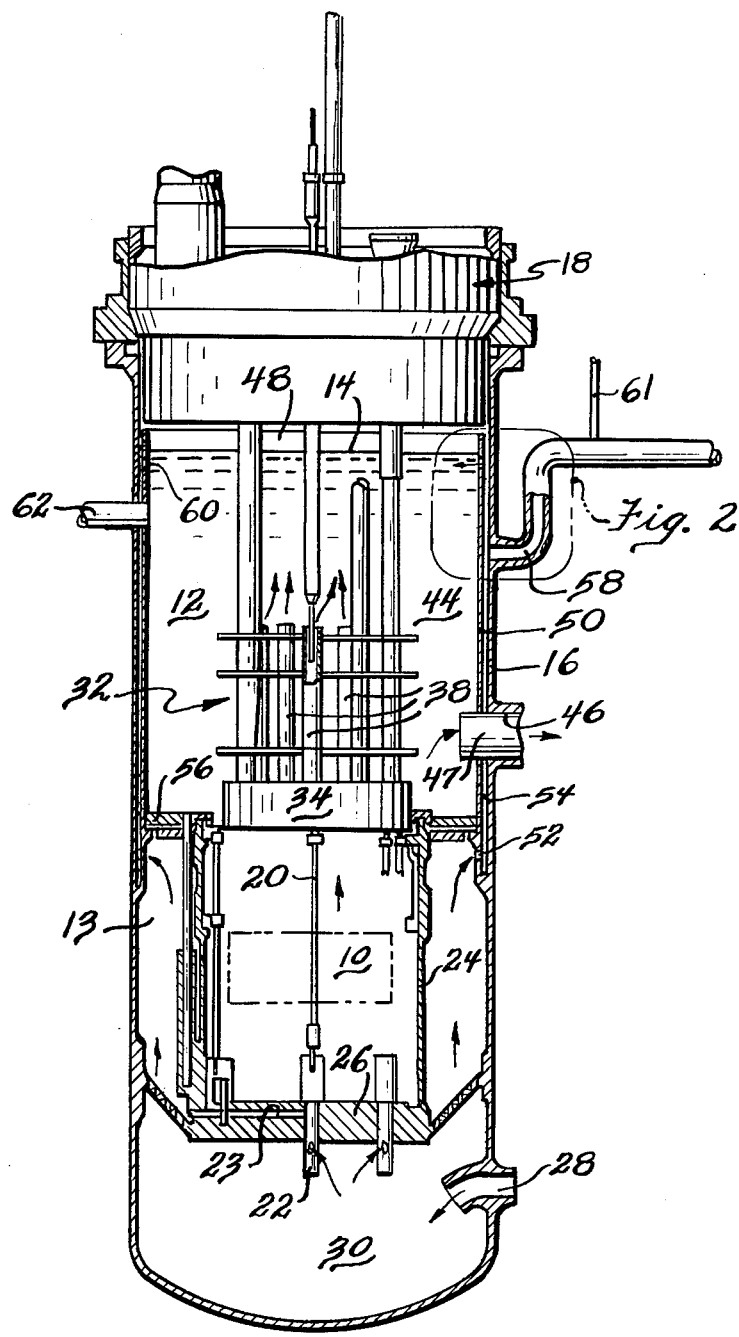
FIG. 1 is a vertical section of a liquid-metal-cooled nuclear reactor incorporating apparatus for controlling coolant level.

FIG. 1 depicts a reactor core 10 composed of nuclear fuel assemblies 20 and submerged in a volume of liquid metal coolant 12 contained within a pressure vessel 16 and having a normal operating coolant level 14. The pressure vessel is closed by a vessel closure head 18. The assemblies 20 rest in inlet modules 22 fixed in a core support plate 26; a cylindrical core barrel 24 confines the fuel assemblies 20. Liquid metal coolant 12 enters the pressure vessel 16 through an inlet nozzle 28 and from an inlet plenum 30 flows into inlet modules 22 and through fuel assemblies 20. Bypass coolant 13 is diverted from the coolant 12 by the modules 22 and passages 23 in core support plate 26 to the annular space between the core barrel 24 and the pressure vessel 16, thus bypassing the reactor core 10. A minor portion, about 2.1 percent, of coolant 12 is diverted in the present design. A major portion of coolant 12 flows through the core 10; the remainder is assigned to leakage past mechanical components and other minor purposes. Fuel assemblies 20 are constrained from above primarily by a hydraulic holddown (not shown) and secondarily by an upper internal structure 32 which depends from the vessel closure head 18 and which is comprised in part of a flow collector 34, and outlet modules 38. Coolant 12 passes out of fuel assemblies 20 through the flow collector 34 and outlet modules 38 to a reactor outlet plenum 44 above the core 10. The purpose of the outlet plenum 44 is to provide mixing of the coolant 12 in order to avoid severe thermal gradients which could damage the reactor. Flow arrows in FIG. 1 indicate the principal directions of circulation of the coolant 12 through the vessel. Coolant pumps, not shown, supply the energy necessary to overcome flow resistance. The volume within the pressure vessel 16 above the normal operating coolant level 14 is filled by an inert cover gas 48. The pressure vessel 16 is protected from the hot coolant 12 in the outlet plenum 44 by a thermal liner 50; the liner is necessary because the design metal temperature of the reactor vessel 16 is 900° F, whereas the design temperature of coolant 12 in the outlet plenum 44 is 1045° F. Coolant 12 leaves the pressure vessel 16 via an outlet nozzle 46; at this point, contact between the coolant and the vessel is controlled by a nozzle liner 47 which is mounted in a hole in the liner 50 and which extends into outlet nozzle 46.

The bypass coolant 13 enters a bypass annulus 54 formed by the separation between the concentric thermal liner 50 and pressure vessel 16 through a plurality of holes 52 located on a horizontal circumference of the thermal liner 50 near its point of attachment to the inside of pressure vessel 16. The liner 50 is generally parallel to the wall of the vessel 16. The holes 52 are located below the outlet plenum 44 and separated therefrom by a horizontal baffle 56 attached to the core barrel 24 at its inner edge, and to the thermal liner 50 at its outer edge. An upper end of the thermal liner 50 is located above the desired normal operating coolant level 14.

Figure 2:
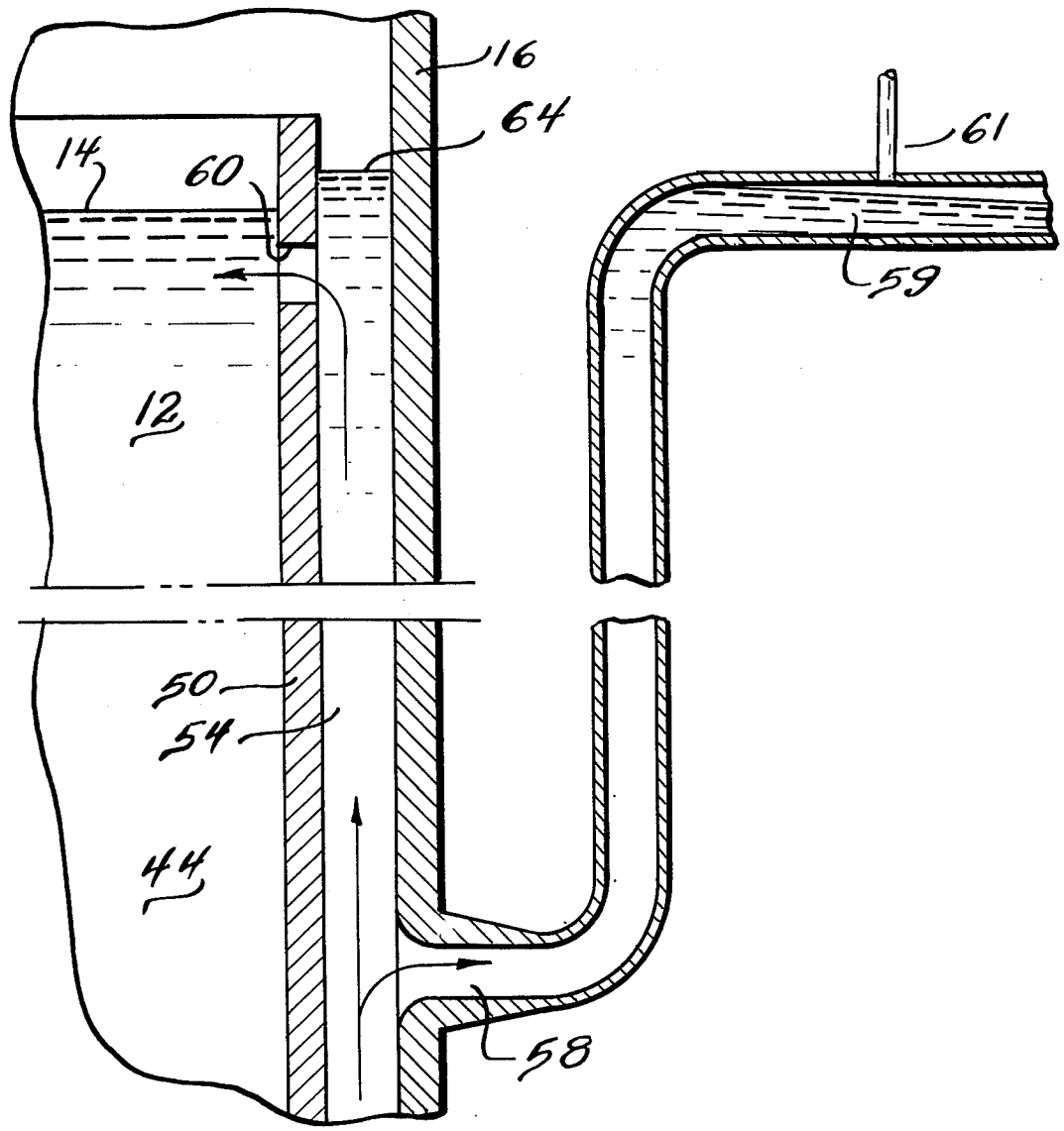
FIG. 2 is a detail view of the area indicated in FIG. 1.

Refer now to FIG. 2 in addition to FIG. 1; a plurality of control ports 60 penetrate the thermal liner 59 about a horizontal circumference of the liner just below the desired plenum coolant level 14. An overflow nozzle 58 penetrates the wall of the pressure vessel 16 below the control ports 60 and communicates the bypass annulus 54 with a coolant overflow tank (not shown) through an overflow line 59 which includes an elevated, horizontal run — provided with a vent 61 to the overflow tank — which establishes the level at which coolant overflows through this line. The interior of the bottom of this horizontal run is at the same elevation as is the top of the control ports 60. This elevation is herein called the overflow elevation. The overflow tank permits accumulation and recovery of the coolant 12. In the present design of the Clinch River Breeder Reactor, the tops of the control ports 60 are at an elevation of −89 inches referred to the top surface of the vessel closure head 18. The normal operating coolant level 14 is at −87 inches. The center line of the 8-inch schedule 40 overflow nozzle 58 is at −148 inches and the interior of the bottom of the horizontal run of the overflow line is also at −89 inches. The upper end of the thermal liner 50 is at −77 inches.

It can be observed from FIG. 1 that the plena 30 and 44 are regions where free mixing of coolant 12 is encouraged; each plenum is perforce characterized by a single coolant pressure at a given elevation. The pressure in the outlet plenum 44 is lower because of higher elevation, less dense coolant (due to higher temperature), and resistance to flow between the plena. The energy of the coolant 12 in the outlet plenum 44 is determined in part by the path by which the coolant 12 reaches the plenum. The coolant 12 which passes through the fuel assemblies 20 comprising the reactor core 10 and inlet and outlet modules 22 and 38 encounters greater resistance to flow than does the bypass coolant 13; therefore, the bypass coolant 13 rises to a bypass annulus level 64 higher than plenum coolant level 14, since less energy has been lost in overcoming flow resistance. The difference in levels, best displayed in FIG. 2, causes a flow of bypass coolant 13 from the bypass annulus 54 to the outlet plenum 44 via the control ports 60 in the thermal liner 50. This accomplishes one purpose of the invention which is to insure that the pressure vessel 16 is not exposed to coolant 12 at 1045° F. Once bypass coolant 13 enters the outlet plenum 44, it becomes indistinguishable from coolant 12.

Addition of makeup coolant through a makeup nozzle 62 shown in FIG. 1 or thermal expansion (swell) of the coolant 12 causes plenum coolant level 14 to increase. At the same time, the bypass annulus coolant level 64 will also increase and thus flow through control ports 60 continues; this precludes the coolant 12 in the plenum 44 from contacting the reactor vessel 16 by reverse flow through control ports 60. If plenum coolant level 14 increases sufficiently, bypass annulus coolant level 64 will increase so that it is above the overflow level of overflow line 59 and overflow will commence.

Bypass coolant 13 will be removed to the coolant overflow tank via overflow nozzle 58 at an increasing rate as bypass annulus coolant level 64 increases. The overflow rate will become constant when it is sufficient to eliminate the rate of change of plenum coolant level 14 and will then remain at an overflow rate equivalent to the makeup rate. Should the makeup rate be discontinued, the level will gradually drop until it is at the overflow elevation. When the cause of the increase in plenum coolant level 14 is removed, that is, when makeup coolant flow ceases or thermal contraction (shrink) occurs, the rate of overflow will exceed the rate of change of plenum coolant level 14. Plenum coolant level 14 will then decrease and will be followed by bypass annulus coolant level 64, thus causing the rate of overflow to also decrease. Overflow ceases as soon as bypass annulus coolant level 64 is below the overflow elevation.

The overflow elevation of the overflow line 59 should be the same as the elevation of the top of the control ports 60. If the control ports 60 are higher than the overflow elevation of overflow line 59, bypass coolant would flow through overflow line 59 in preference to control ports 60. This would mean that the coolant level would go down when no makeup coolant was being added. It is in addition desirable to minimize the volume of stagnant coolant in the bypass annulus above the top of control ports 60. This is accomplished by setting the overflow elevation of overflow line 59 equal to the top of control ports 60. If the control ports 60 are lower than the overflow elevation of overflow line 59, the depth of stagnant coolant at the top of the bypass annulus would increase. Since the coolant is a good conductor of heat, the heat of hot outlet sodium would be conducted through stagnant coolant to the pressure vessel. As disclosed, there are a few inches of coolant above the top of the outlet ports 60 through which the heat of the hot outlet coolant can be conducted. Since there is some mixing due to the rising current of coolant in the bypass annulus, the temperature at the pressure vessel will be within design limits.

This overflow concept permits:

1. Operation without makeup.
2. Operation with a continuous makeup flow at any constant rate (within design limits).
3. Operation with a continuous makeup flow at a variable flow rate.

i.e.

1. 0 makeup, 0 overflow.
2. 150 GPM makeup, 150 GPM overflow. 60 GPM makeup, 60 GPM overflow.
3. 60→800 GPM makeup, 60→800 GPM overflow.

It will be noted that an alternative construction in which the outlet nozzle is at an elevation above the normal operating coolant level would function similarly, but this construction is not as desirable as the preferred construction described above since the nozzle in the reactor would be partially filled with coolant, causing high cyclic stresses. According to the preferred embodiment, the nozzle is at all times filled with coolant and the cyclic stresses are transferred to the overflow line, a more manageable location.

The embodiments of the invention in which an exclusive property or privilege is claimed are defined as follows:

1. In a liquid-metal-cooled fast-breeder reactor incorporating a core submerged in liquid metal coolant within a pressure vessel, there being an inlet coolant plenum below the core and an outlet coolant plenum above the core, a thermal liner extending from the bottom of the outlet plenum to above the normal operating coolant level in the outlet plenum spaced from the pressure vessel to define a bypass annulus therebetween, and means for establishing a bypass flow of coolant through the bypass annulus to insulate the pressure vessel from the hot coolant in the outlet plenum, said means for establishing a bypass flow of coolant including means for bypassing a portion of the coolant from the inlet coolant plenum around the core and into the bypass annulus, the improvement wherein the thermal liner has a plurality of control ports therein located just below the normal operating coolant level in the pressure vessel and wherein the improvement includes an overflow nozzle located in the pressure vessel below the control ports connected to an overflow line leading to an exterior overflow vessel, said overflow line including a portion at an elevation such that overflow coolant flow is established therethrough when the coolant level in the outlet plenum is above the top of the control ports.

2. The improvement of claim 1 wherein the overflow line includes an elevated horizontal run which establishes the elevation at which overflow coolant flow occurs.

3. The improvement of claim 2 wherein the top of the coolant ports and the bottom of the horizontal run of the overflow line are at an elevation of −89 inches with respect to the top surface of the vessel closure head, the center line of the overflow nozzle is at an elevation of −148 inches with respect to the same reference elevation and the normal operating coolant level is 2 inches above the top of the outlet ports.

* * * * *